Sept. 12, 1944.　　　　E. SCHEYER　　　　2,357,851
HEAT REFLECTIVE MATERIAL
Filed Dec. 11, 1940
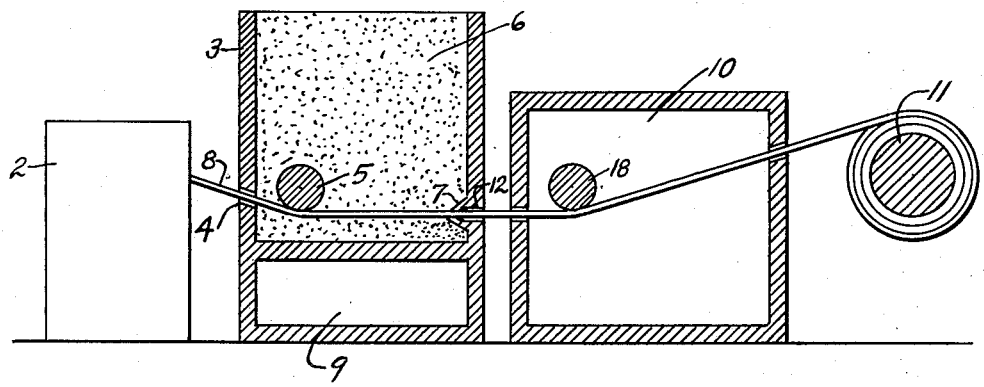
INVENTOR
Emanuel Scheyer

UNITED STATES PATENT OFFICE 2,357,851

HEAT REFLECTIVE MATERIAL

Emanuel Scheyer, Brooklyn, N. Y.

Application December 11, 1940, Serial No. 369,595

13 Claims. (Cl. 106—193)

This invention relates to a layer to be used in a covering for the living body, such as in bedclothes, garments, hats, gloves and footwear, which layer depends to a great extent for its heat-insulative action upon reflection. Under certain conditions the layer by itself can be used as the body covering, but preferably it is to be used in a body covering as a lining or interlining.

As is well known, heat is lost from a body by radiation and diffusion. It is an object of the present invention to provide in and for a body covering a layer or layers of material of certain forms which will, due to said material include prevention of heat loss by radiation. Layers for this purpose are known to the prior art. In the present invention improved forms are provided.

Experiment has shown that at least one half of the heat lost at the temperature of a living body is by radiation. A layer of material is used, according to the present invention, in the body covering which layer has high reflective qualities, to reduce such loss. An example of such a layer would be one of a textile fabric woven from cellulose acetate, the fibers of which have incorporated in them fine aluminum flakes such as are used in aluminum paints. While a layer of aluminum foil would be more effective, having a surface of lower emissivity, it would deteriorate under the conditions of flexing, folding, stretching and creasing which prevail in the use of body coverings.

Flakes are my preferred form, although other shaped particles can be used having surfaces of low emissivity. Other metals can be used beside aluminum, such for example as copper and zinc and various alloys. Further, the particles or flakes need not necessarily be of metal, although metal is preferred, provided they have a surface of low emissivity.

Examples of the latter would be particles of the material used in the layer described in Patent No. 2,001,912. Mica flakes can also be used. In every case, the material of the particles must be compatible with the plastic material. It is well known to those versed in the science of heat, that the lower the emissivity value is of a surface, the more heat it will reflect.

Heat insulation by reflection is well known to the art. Buildings and steam pipes have long been insulated by the use of heat reflective layers combined with diffusive heat insulators such as layers of asbestos or paper. The well known vacuum bottle for keeping food hot or cold uses silvered mirror surfaces for reflecting heat.

A heat reflective layer for use in a body covering must be both flexible and permeable to air in addition to having high reflective properties, that is, low emissivity. It must be flexible so that it can be readily thrown about and flexed by the wearer, and it must be permeable to air to make it hygienically possible for use, that is, to permit escape of perspiration from the skin of the wearer. A textile fabric is inherently permeable to air. Inherently impermeable layers, such as a film of regenerated cellulose, must be provided with openings distributed over various portions of its extent.

My material may be used, instead of for body coverings, in other places where a heat reflective material of its characteristics would be useful.

In the preferred form of my invention, the fibers are rendered heat reflective or are caused to have low emissivity before they are manufactured into textile fabrics. The fibers may be given a coating of preformed particles, such as aluminum flakes, to form a surface of low emissivity, or the fibers may be formed of synthetic materials or plastics with particles incorporated in them, said latter materials being preferably transparent. Examples of such latter materials are regenerated cellulose, cellulose acetate, nitro-cellulose, vinyl resins, ureaformaldehyde resin, synthetic linear condensation superpolymers as described in Patent No. 2,071,250, including synthetic linear condensation polyamides, Patent No. 2,130,948.

In any case, the material of the particles incorporated or attached to the textile fabric or film must be compatible with the material of the latter or with the reagents used for the latter after the time the particles are added. For example it would not be advisable to mix aluminum flakes in the viscose solution used in the production of regenerated cellulose. The caustic soda which is used for the solution corrodes aluminum. On the other hand with cellulose acetate, aluminum may be mixed in the spinning solution because the solvent, acetone, has little effect on aluminum.

The treated fibers must be flexible enough to be suitable for manufacture into textile fabrics. Where the fibers are given a coating, any of the well known staple fibers may be used, such as wool, cotton, flax and silk in addition to fibers of synthetic materials as noted above. The coating may be attached to the fibers by a flexible adhesive such as rubber, or its adherence may be effected in the case of some of the plastics by rendering the latter soft and tacky by chemical or heat treatment no adhesive being used. The chemical or heat treatment allows the particles to become embedded in the fibers at their surface.

In another form of my invention, a film, layer or already manufactured fabric, made of a flexible synthetic plastic material is given a coating of particles for producing a surface of low emissivity, the adherence of the particles being also effected by rendering the material tacky by softening the material itself by heat or chemical treatment, no added adhesive being used.

In still another form a sheet or film of flexible transparent plastic has the particles of low emissivity incorporated in it.

Other objects and advantages will become apparent upon further study of the description and drawing which is a diagrammatic elevation, partially in section of an apparatus for coating the material with particles of low emissivity such as aluminum flakes.

In one form of my invention, the heat reflective layer is formed of a film or of fibers made into a textile fabric, the material of the film or fibers being flexible synthetic plastic having incorporated therein particles with surfaces of low emissivity. Enough particles are incorporated to reflect a large part of the heat radiated to the layer.

An example would comprise cellulose acetate having incorporated therein aluminum flakes. With the cellulose acetate dissolved in a solvent as acetone, aluminum flakes are incorporated in the solution by mechanical mixing. A way of incorporating particles is described in Patent No. 1,961,229. A suitable mixture would be one pound of aluminum flakes of the fineness of the product sold by the Aluminum Co. of America under the name of "Extra Brilliant Varnish Alcoa Albion Powder," No. 301 and three pounds of non-volatile solid in a suitable solvent as cellulose acetate in acetone. The flakes of the above noted powder will pass through a 120 mesh sieve and one gram of them floating on water one particle deep will cover 3200 square centimeters. The above is only by way of example, the proportion of flakes or particles to non-volatile solid may vary widely and still produce a suitable material. For instance the thickness of the flakes is a factor, a thinner flake giving a greater covering power than a thicker one. If the metal or material of the flakes or powder be other than aluminum, such as copper, a greater proportion by weight is needed for the flakes, as copper, having a higher specific gravity will have less covering power per pound. Instead of using the powdered aluminum in dry form it may be used in the form of a paste provided the substances added to the metal to produce the paste are compatible with the plastic or solvents used for it. See Patents Nos. 1,569,484 and 2,002,891.

When the particles have been thoroughly and homogeneously incorporated, the solution of the plastic is forced through a slit to form a film, or forced through spinnerets to form filaments. The holes in the spinnerets must be large enough to pass the particles in the solution. Other ways known to the art for producing filaments may be used. See Patent No. 2,130,948. Enough flakes must be incorporated to render the material heat reflective. When the film is used as a layer in a body covering, it must be foraminous, that is provided with openings. The openings are for the purpose of providing ventilation. My preferred form, however, is to use the plastic with the particles incorporated therein in the form of fibers made up into a textile fabric or material. The fibers may be substantially continuous filaments as obtained in the spinning of the plastic or they may be staple fibers obtained by cutting up filaments or film.

For the purpose of describing this invention and in the appended claims, the term "textile fabric" is intended to have the generally accepted meaning of the term including woven, knitted, knotted, netted or felt fabrics.

In the example previously described, the particles of low emissivity were incorporated in the mass of stuff used for the plastic, while the stuff was in solution. Another way of incorporating the particles would be to do it while the mass was in molten condition. Certain plastics are known as thermoplastics. They can be spun while molten. Examples of such plastics are the synthetic linear condensation polyamides described in Patent No. 2,130,948. Aluminum flakes are added to one of the plastics, of said patent, while molten, in the proportions noted above for cellulose acetate. The molten mixture is then spun into a film or filaments. Other thermoplastic materials may be used for making the molten spinning mixture to produce the heat reflective layer. Examples of such material are organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. See Patent No. 2,153,352.

As noted before, while not my preferred type, a heat reflective textile fabric can be made by coating filaments with heat reflective particles and then producing the fabric from the filaments. There are two general ways of accomplishing this. One is by causing the particles to stick to the filaments by holding them on with adhesive and the other is by causing tacky filaments to hold the particles without the use of adhesive.

The adhesives employed may be of two general kinds: one in which the adhesive is in a solution when applied and the other where the adhesive is molten when applied. An example of adding the particles to the filaments by the adhesive in solution is the use of aluminum flakes in a phenolic resin base varnish. The details of the preparation and composition of such an aluminum paint are well known to the art. Such information, for example, can be found on page 81, of the Aluminum Paint Manual, issued in 1937 by the Aluminum Company of America. Adhesives, by way of example, suitable when molten, for adding the particles to the filaments, are the synthetic resins described in Patent No. 1,992,249. By mixing one of these adhesives while molten with aluminum flakes and passing the filaments through the mixture, the filaments can be coated. In addition to coating synthetic filaments, where adhesives, either dissolved or molten, are used, yarn made from staple fibers can be coated. The staple fibers may be synthetic or they may be of natural material such as wool, silk and cotton.

There are two general ways of adding the particles to filaments without the use of adhesive. One is by softening the filament with a chemical solution to render it tacky and the other is to render it tacky by the use of heat.

As an example of adding the particles by softening with a chemical solution, cellulose acetate filaments are treated in a heated sodium chloride bath. The time of treatment is until the filaments are sufficiently softened. See Example II in Patent No. 1,870,408. Some of the examples given in this patent use an adhesive in combination with a softener. The softened filaments are then passed through a mass of aluminum flakes in a manner to be explained hereinafter. The addition of a corrosion inhibitor, such as sodium chromate, to the sodium chloride solution will help to keep the aluminum flakes bright. Cellulose acetate yarn can also be similarly treated as well as already manufactured or woven acetate fabric and film. Where the softening by heat method is used, one of the thermoplastic materials previously mentioned has the filaments thereof while still plastic, just after the spinning, passed through a mass of heated aluminum flakes, effecting the coating of the filaments with said flakes. Thermoplastic materials can also be coated by having the filaments thereof reheated to become tacky and then passed through the mass of heated aluminum flakes. The same applies to thermoplastic yarn, already manufactured fabric and film.

In all the coating methods given for use with a textile fabric, a superior product is obtained where the individual filaments are coated before being made up into the textile fabric. In the case of natural staple fiber, the yarn may be treated. Where staple fiber is made by cutting up filaments, it is best to treat the filaments before being cut into staple.

Particles in the form of flakes, such as aluminum flakes, have the property known as "leafing" because the flakes in the vehicle become arranged much as fallen leaves forming a substantially continuous film of aluminum thereby increasing reflectivity. The opposite sides of flakes are reflective and consequently that of the film also.

Where the reflective particles are located in transparent material, such as cellulose acetate, the fabric or film made with same will be reflective on both its surfaces, reflecting heat radiated to one of its surfaces and reducing emission of heat absorbed by it from the other surface. A satin weave will increase the reflectivity of the satin finish surface.

In the coated product and method, where an adhesive is used, the coating may be done on the already formed yarns, threads and other units which are used in the weaving or otherwise forming of the textile fabric. This holds true both with synthetic and natural materials. Where the coating is done by softening, it may also be done on the already formed yarns, threads and other units which are used in the weaving or otherwise forming of the textile fabric and also on the finished fabric as well as films.

In the drawing, which shows the coating apparatus, the part 2 is where the synthetic material is spun, issuing therefrom, say, as a filament 8. Box 3, which holds the particles of low emissivity, such as bright aluminum flakes 6, is provided with a hole 4, a guide roller 5 and a discharge hole 12. Adjacent hole 12 are scraper lips 7. Below box 3 is a heater 9 for warming flakes 6 when desired. Adjacent box 3 is a drier 10 through which the filament travels. Filament 8 passes under guide roller 18 on its way through drier 10. A take up spool, bobbin or other device well known to the textile art is provided at 11. Filament 8 is shown exaggerated in diameter.

I. In the case where the filaments are formed by being spun from a solution of the plastic, as in the case of cellulose acetate, the filament 8 issues while still tacky, entering box 3 through hole 4, passing under roller 5 out hole 12, through drier 10 onto take-up spool 11. In passing through the flakes 6 in box 3, filament 8, which is tacky, becomes coated with them, the excess being scraped off as the filament passes by scraper lips 7. After leaving box 3, the filament is dried by passing through drier 10. Heater 9 is not used with the solution spinning just described.

II. Where a thermoplastic plastic is spun into a filament 8, the latter passes through the apparatus and becomes coated in the manner just described, except that in this case heater 9 is used to heat flakes 6. Also, no use is made of drier 10. The material is spun in part 2.

III. In the case where already spun filament 8 is to be coated and the chemical softening process previously described is to be used, the part 2 can be considered as the place where the filament is softened by a chemical, the filament issuing therefrom and passing through the rest of the apparatus as described above for case I.

IV. In the case where already spun thermoplastic filament 8 is to be coated by heating it to render it tacky, the apparatus 2 can be considered as the place where the filament is so treated, the filament issuing therefrom and passing through the rest of the apparatus as described above for case II.

V. In the case where already spun filament 8 is to be coated by the use of the particles in an adhesive, apparatus 2 can be considered merely as a container from whence the filaments are fed to box 3. The aluminum flakes, say, in box 3 are mixed in an adhesive vehicle, either as a solution or a thermoplastic. In the latter case, heater 9 is used. As the filament 8 passes through box 3 with its flakes in an adhesive, the filament becomes coated. Drier 10 is used only where the adhesive is in a solvent.

In all cases, as noted before, instead of coating a filament, yarn, thread and other units which are used in weaving or otherwise forming a textile fabric can be coated. In case V natural yarns, threads and said other units can be coated as well as synthetic material. In cases III and IV film and completed textile fabric can be coated.

While holes only for one filament are shown, it will be understood a row of holes is to be used to accommodate a plurality of filaments. In cases III and IV where it may be desired to coat a film or completed textile fabric the holes will be replaced by slots.

The term "synthetic fibers" as used in the claims is intended to have a broad enough meaning, where consistent with the context, to include the idea of synthetic filaments, synthetic staple fibers, synthetic yarn and whatever units are made of said yarn, fibers and filaments used in the weaving or otherwise forming of the textile fabric.

I claim:

1. As an insulation medium, a textile fabric having synthetic fibers and flakes of material having a surface of low emissivity incorporated in the interior of the fibers in sufficient quantity to render the fabric substantially heat reflective.

2. As an insulation medium, a textile fabric having synthetic fibers and metal flakes having a surface of low emissivity incorporated in the interior of the fibers in sufficient quantity to render the fabric substantially heat reflective.

3. As an insulation medium, a textile fabric having substantially transparent synthetic fibers and aluminum flakes incorporated in the interior of the fibers in sufficient quantity to render the fabric substantially heat reflective.

4. As an insulation medium, a textile fabric having substantially transparent synthetic fibers and flakes of material having a surface of low emissivity incorporated in the interior of the fibers in sufficient quantity to render the fabric substantially heat reflective.

5. As a heat reflective medium, a satin weave fabric having synthetic fibers and particles of material having a surface of low emissivity incorporated in the interior of the fibers in sufficient quantity to render the fabric substantially heat reflective.

6. As a heat reflective medium, a satin weave fabric having transparent synthetic fibers and particles of material having a surface of low emissivity incorporated in the interior of the fibers in sufficient quantity to render the fabric substantially heat reflective.

7. As a heat reflective medium, a satin weave fabric having synthetic fibers and flakes of metal having a surface of low emissivity incorporated in the interior of the fibers in sufficient quantity to render the fabric substantially heat reflective.

8. A heat reflective layer formed of synthetic fibers and particles of material having a surface of low emissivity incorporated in the interior of the fibers in sufficient quantity to render the layer substantially heat reflective.

9. A heat reflective layer formed of synthetic fibers and aluminum flakes incorporated in the body of the fibers in sufficient quantity to render the layer substantially heat reflective.

10. A heat reflective layer formed of transparent synthetic fibers and metal particles having a surface of low emissivity incorporated in the interior of the fibers in sufficient quantity to render the layer substantially heat reflective.

11. A heat reflective layer formed of cellulose acetate fibers and aluminum flakes incorporated in the interior of the fibers and leafed together, there being a sufficient quantity of the flakes to render the layer substantially heat reflective.

12. A heat reflective layer formed of cellulose acetate fibers and metal particles incorporated in the interior of the fibers in sufficient quantity to render the layer substantially heat reflective.

13. A heat reflective layer formed of transparent synthetic fibers and particles of material having a surface of low emissivity incorporated in the interior of the fibers in sufficient quantity to render the layer substantially heat reflective.

EMANUEL SCHEYER.